United States Patent
Zhang et al.

(10) Patent No.: US 11,593,969 B2
(45) Date of Patent: Feb. 28, 2023

(54) METHOD AND APPARATUS FOR GEOMETRY MERGE MODE FOR POINT CLOUD CODING

(71) Applicant: TENCENT AMERICA LLC, Palo Alto, CA (US)

(72) Inventors: Xiang Zhang, Sunnyvale, CA (US); Wen Gao, West Windsor, NJ (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 289 days.

(21) Appl. No.: 16/923,609

(22) Filed: Jul. 8, 2020

(65) Prior Publication Data
US 2021/0012539 A1    Jan. 14, 2021

Related U.S. Application Data

(60) Provisional application No. 62/873,676, filed on Jul. 12, 2019.

(51) Int. Cl.
*G06T 9/40* (2006.01)
*H04N 19/46* (2014.01)
(Continued)

(52) U.S. Cl.
CPC ............. *G06T 9/40* (2013.01); *H04N 19/105* (2014.11); *H04N 19/119* (2014.11);
(Continued)

(58) Field of Classification Search
CPC ......... G06T 9/001; G06T 9/40; H04N 19/105; H04N 19/119; H04N 19/167; H04N 19/17;
(Continued)

(56) References Cited

U.S. PATENT DOCUMENTS

| | | |
|---|---|---|
| 2015/0103073 A1 | 4/2015 | Tian et al. |
| 2019/0080483 A1 | 3/2019 | Mammou et al. |
| 2020/0258202 A1* | 8/2020 | Cai .......................... G06T 5/005 |

FOREIGN PATENT DOCUMENTS

WO    2019/129919 A1    7/2019

OTHER PUBLICATIONS

Huang et al., "Octree-Based Progressive Geometry Coding of Point Clouds", Eurographics Symposium on Point-Based Graphics, 2006, pp. 103-110 (8 pages total).
(Continued)

*Primary Examiner* — Anner N Holder
(74) *Attorney, Agent, or Firm* — Sughrue Mion, PLLC

(57) ABSTRACT

A method of a geometry merge mode for point cloud coding (PCC), is performed by at least one processor, and includes obtaining a candidate node of an octree partition of a point cloud, for a current node of the octree partition, the current node being currently-coded, and the candidate node being previously-coded. The method further includes obtaining an occupancy code of the obtained candidate node, constructing a candidate list including the obtained occupancy code of the candidate node, obtaining an occupancy code of the current node, based on the constructed candidate list, and performing the PCC, based on the obtained occupancy code of the current node.

20 Claims, 9 Drawing Sheets

(51) Int. Cl.
  *H04N 19/96* (2014.01)
  *H04N 19/105* (2014.01)
  *H04N 19/119* (2014.01)
  *H04N 19/172* (2014.01)
(52) U.S. Cl.
  CPC ........... *H04N 19/172* (2014.11); *H04N 19/46* (2014.11); *H04N 19/96* (2014.11)
(58) Field of Classification Search
  CPC .... H04N 19/172; H04N 19/46; H04N 19/597; H04N 19/70; H04N 19/96
  See application file for complete search history.

(56) References Cited

OTHER PUBLICATIONS

Written Opinion and International Search Report dated Oct. 13, 2020 from the International Searching Authority for International Application No. PCT/US2020/041572.

Rufael Mekuria et al., "Requirements for Point Cloud Compression", International Organisation for Standardisation Organisation Internationale De Normalisation ISO/IEC JTC1/SC29/WG11 MPEG2016/n16330, Feb. 2016.

Christian Tulvan et al., "Use Cases for Point Cloud Compression(PCC)", International Organisation for Standardisation Organisation Internationale De Normalisation ISO/IEC JTC1/SC29/WG11 MPEG2015/N16331, Jun. 2016.

Khaled Mammou et al., "G-PCC codec description v2", International Organisation for Standardisation Organisation Internationale De Normalisation ISO/IEC JTC1/SC29/WG11 N18189, Jan. 2019. "Information technology—MPEG-I (Coded Representation of Immersive Media)—Part 9: Geometry-based Point Cloud Compression", ISO/IEC 23090-2:2019(E).

Extended European Search Report dated Aug. 26, 2022 in European Application No. 20840051.5.

Khaled Mammou et al., "Binarization of occupancy information in TMC13", International Organisation for Standardisation Organisation Internationale De Normalisation ISO/IEC JTC1/SC29/WG11 Coding of Moving Pictures and Audio, ISO/IEC JTC1/SC29/WG11 MPEG2018/m43592, 2018 (7 pages total).

3DG, "G-PCC codec description v3", International Organisation for Standardisation Organisation Internationale De Normalisation ISO/IEC JTC1/SC29/WG11 Coding of Moving Pictures and Audio, ISO/IEC JTC1/SC29/WG11, N18486, 2019 (51 pages total).

Sebastien Lasserre & Michael Zink et al., "Using neighbouring nodes for the compression of octrees representing the geometry of point clouds", ACM MMSys' 19, 2019, pp. 145-153 (9 pages total).

* cited by examiner

METHOD AND APPARATUS FOR GEOMETRY MERGE MODE FOR POINT CLOUD CODING

CROSS-REFERENCE TO RELATED APPLICATION

This application claims priority from U.S. Provisional Patent Application No. 62/873,676, filed on Jul. 12, 2019, in the U.S. Patent and Trademark Office, the disclosure of which is incorporated herein by reference in its entirety.

BACKGROUND

Point cloud has been widely used in recent years. For example, it is used in autonomous driving vehicles for object detection and localization, in geographic information systems (GIS) for mapping, and in cultural heritage to visualize and archive cultural heritage objects and collections.

Point clouds contain a set of high dimensional points, for example, three dimensional (3D) points, each including 3D position information and additional attributes such as color, reflectance, etc. The high dimensional points can be captured using multiple cameras and depth sensors, or Lidar in various setups, and may be made up of thousands up to billions of points to realistically represent original scenes.

Compression technologies are used to reduce an amount of data used to represent a point cloud for faster transmission or reduction of storage. ISO (International Organization for Standardization)/IEC (International Electrotechnical Commission) MPEG (Moving Picture Experts Group) (JTC 1/SC 29/WG 11) has created an ad-hoc group MPEG-PCC (Point Cloud Coding) to standardize the compression techniques for static or dynamic clouds.

Point-Cloud Compression in Test Model 13 (TMC13) in MPEG

In the TMC13 model, geometry information and associated attributes, such as color and reflectance, are separately compressed. The geometry information, which includes 3D coordinates of point clouds, is coded by octree partition with its occupancy information. The attributes are then compressed based on reconstructed geometry, using prediction, lifting and region adaptive hierarchical transform techniques. The octree partition and occupancy encoding processes are elaborated below.

Octree Partition

FIG. 1A is a diagram of octree partition in a 3D space.

Referring to FIG. 1A, in TMC13, if an octree geometry codec is used, geometry encoding proceeds as follows. First, a cubical axis-aligned bounding box B is defined by two points (0,0,0) and ($2^d$, $2^d$, $2^d$), where $2^d$ defines a size of B and d is encoded in a bitstream.

An octree structure is then built by recursively subdividing B. At each stage, a cube is subdivided into 8 sub-cubes. An 8-bit code, namely an occupancy code, is then generated by associating a 1-bit value with each sub-cube to indicate whether it contains points (i.e., is full and has value 1) or not (i.e., is empty and has value 0). Only full sub-cubes with a size greater than 1 (i.e., non-voxels) are further subdivided.

FIG. 1B is a diagram of an octree partition and its tree structure.

Referring to FIG. 1B, an example of a two-level octree partition and corresponding occupancy codes are shown. Cubes and nodes that are shaded indicate they are occupied by points.

Encoding of Occupancy Code

An occupancy code is then compressed for each node by an arithmetic encoder. The occupancy code can be denoted as S, which is an 8-bit integer, and each bit in S indicates an occupancy status of each child node. Two encoding methods for the occupancy code exist in TMC13, i.e., bit-wise encoding and byte-wise encoding, and the bit-wise encoding is enabled by default.

For bit-wise encoding, eight bins in S are encoded in an order in which each bin is encoded by referring to occupancy statuses of neighboring nodes and child nodes of neighboring nodes, in which the neighboring nodes are in the same level of a current node.

For byte-wise encoding, S is encoded by referring to: an adaptive look up table (A-LUT), which keeps track of N (e.g., 32) most frequent occupancy codes; and a cache that keeps track of last different observed M (e.g., 16) occupancy codes.

Binary information indicating whether S is in the A-LUT or not is encoded. If S is in the A-LUT, an index in the A-LUT is encoded using a binary arithmetic encoder. If S is not in the A-LUT, then binary information indicating whether S is in the cache or not is encoded. If S is in the cache, then binary representation of its index is encoded using a binary arithmetic encoder. Otherwise, if S is not in the cache, then the binary representation of S is encoded using a binary arithmetic encoder.

A decoding process starts by parsing dimensions of a bounding box B from a bitstream. The same octree structure is then built by subdividing B according to decoded occupancy codes.

In current TMC13 design, an occupancy code S is encoded by bit-wise encoding by default, in which each bin of S is encoded separately. Though occupancy statuses of neighboring coded nodes is used for context modeling when encoding each bin of S, structure information of the neighboring coded nodes is not fully utilized.

FIG. 1C is a diagram of repeating line structures creating repeating patterns of occupancy codes in two dimensions (2D).

Referring to FIG. 1C, three diagonal dashed lines are observed in a 2D space, in which representing points are located along the lines. As a result, occupancy statuses of nodes shows explicit structures, in which occupancy codes are repeating across space. However, current TMC13 does not fully utilize this structural similarity in the occupancy codes.

SUMMARY

According to embodiments, a method of a geometry merge mode for point cloud coding (PCC), is performed by at least one processor, and includes obtaining a candidate node of an octree partition of a point cloud, for a current node of the octree partition, the current node being currently-coded, and the candidate node being previously-coded. The method further includes obtaining an occupancy code of the obtained candidate node, constructing a candidate list including the obtained occupancy code of the candidate node, obtaining an occupancy code of the current node, based on the constructed candidate list, and performing the PCC, based on the obtained occupancy code of the current node.

According to embodiments, an apparatus for a geometry merge mode for point cloud coding (PCC), includes at least one memory configured to store program code, and at least one processor configured to read the program code and operate as instructed by the program code. The program code includes first obtaining code configured to cause the at least one processor to obtain a candidate node of an octree partition of a point cloud, for a current node of the octree partition, the current node being currently-coded, and the candidate node being previously-coded. The program code further includes second obtaining code configured to cause the at least one processor to obtain an occupancy code of the obtained candidate node, constructing code configured to cause the at least one processor to construct a candidate list including the obtained occupancy code of the candidate node, third obtaining code configured to cause the at least one processor to obtain an occupancy code of the current node, based on the constructed candidate list, and performing code configured to cause the at least one processor to perform the PCC, based on the obtained occupancy code of the current node.

According to embodiments, a non-transitory computer-readable medium stores instructions that, when executed by at least one processor of an apparatus for a geometry merge mode for point cloud coding (PCC), causes the at least one processor to obtain a candidate node of an octree partition of a point cloud, for a current node of the octree partition, the current node being currently-coded, and the candidate node being previously-coded. The instructions further cause the at least one processor to obtain an occupancy code of the obtained candidate node, construct a candidate list including the obtained occupancy code of the candidate node, obtain an occupancy code of the current node, based on the constructed candidate list, and perform the PCC, based on the obtained occupancy code of the current node.

DETAILED DESCRIPTION

This disclosure is related to geometry compression in PCC. In methods, an occupancy code of a current node can be derived or predicted from already-coded nodes. Signaling methods of the coding mode are also elaborated in this disclosure.

In detail, a new occupancy code encoding method (i.e., a merge mode) is presented. An occupancy code of a current node can be derived or predicted from already-coded nodes. A candidate list is constructed for the current node, and consists of occupancy codes derived from the already-coded nodes. By signaling an index to the constructed candidate list, the occupancy code of the current node can be directly derived from the candidate list without encoding each bin. Alternatively, a difference between the occupancy code of the current node and a referenced occupancy code can be further signaled. Methods of candidate list construction and methods of merge mode signaling are elaborated below.

Figure 2:
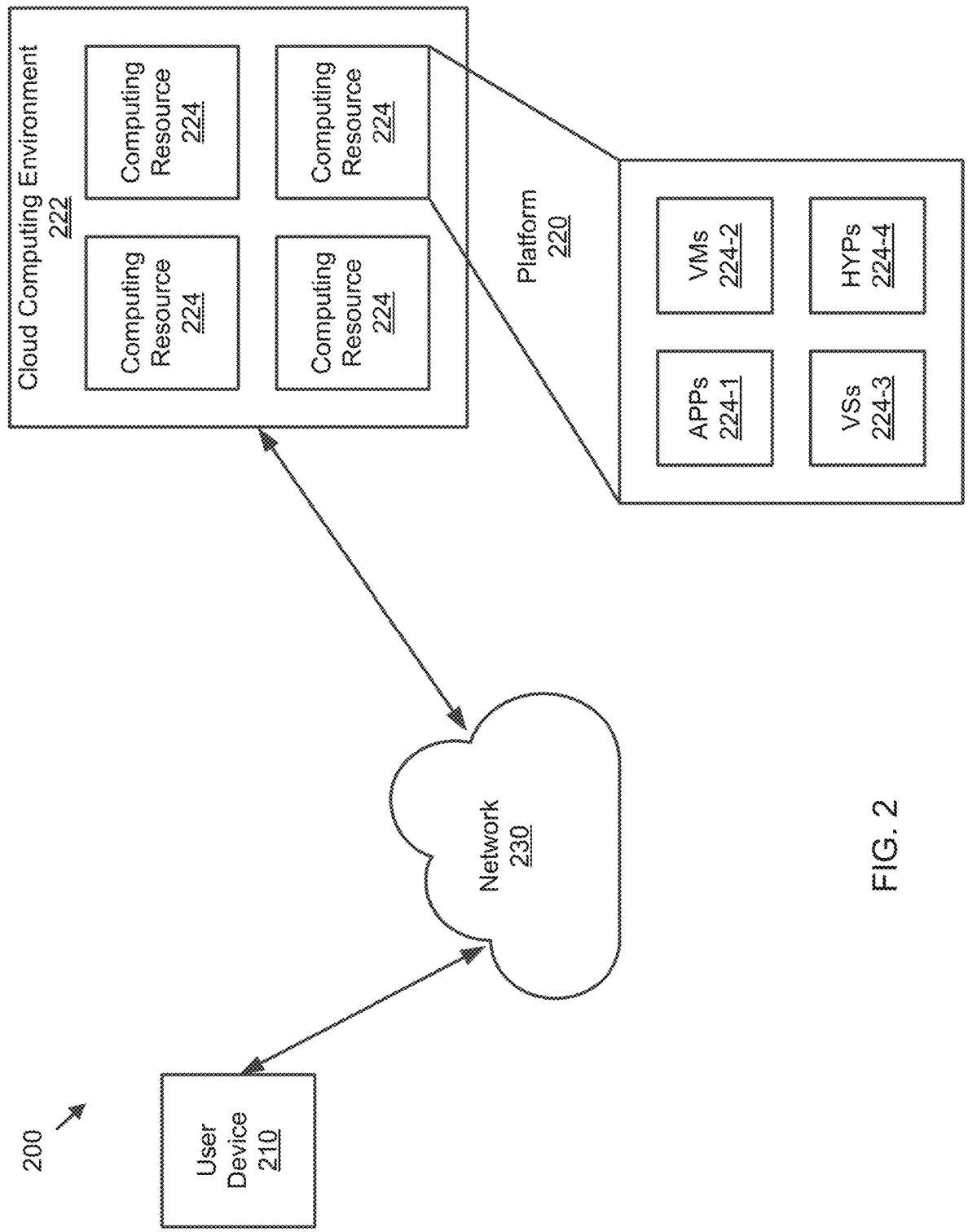
FIG. 2 is a diagram of an environment in which methods, apparatuses and systems described herein may be implemented, according to embodiments.

FIG. 2 is a diagram of an environment 200 in which methods, apparatuses and systems described herein may be implemented, according to embodiments. As shown in FIG. 2, the environment 200 may include a user device 210, a platform 220, and a network 230. Devices of the environment 200 may interconnect via wired connections, wireless connections, or a combination of wired and wireless connections.

The user device 210 includes one or more devices capable of receiving, generating, storing, processing, and/or providing information associated with platform 220. For example, the user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 210 may receive information from and/or transmit information to the platform 220.

The platform 220 includes one or more devices as described elsewhere herein. In some implementations, the platform 220 may include a cloud server or a group of cloud servers. In some implementations, the platform 220 may be designed to be modular such that software components may be swapped in or out. As such, the platform 220 may be easily and/or quickly reconfigured for different uses.

In some implementations, as shown, the platform 220 may be hosted in a cloud computing environment 222. Notably, while implementations described herein describe the platform 220 as being hosted in the cloud computing environment 222, in some implementations, the platform 220 may not be cloud-based (i.e., may be implemented outside of a cloud computing environment) or may be partially cloud-based.

The cloud computing environment 222 includes an environment that hosts the platform 220. The cloud computing environment 222 may provide computation, software, data access, storage, etc. services that do not require end-user (e.g., the user device 210) knowledge of a physical location and configuration of system(s) and/or device(s) that hosts the platform 220. As shown, the cloud computing environment 222 may include a group of computing resources 224 (referred to collectively as "computing resources 224" and individually as "computing resource 224").

The computing resource 224 includes one or more personal computers, workstation computers, server devices, or other types of computation and/or communication devices. In some implementations, the computing resource 224 may host the platform 220. The cloud resources may include compute instances executing in the computing resource 224, storage devices provided in the computing resource 224, data transfer devices provided by the computing resource 224, etc. In some implementations, the computing resource 224 may communicate with other computing resources 224 via wired connections, wireless connections, or a combination of wired and wireless connections.

As further shown in FIG. 2, the computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

The application 224-1 includes one or more software applications that may be provided to or accessed by the user device 210 and/or the platform 220. The application 224-1 may eliminate a need to install and execute the software applications on the user device 210. For example, the application 224-1 may include software associated with the platform 220 and/or any other software capable of being provided via the cloud computing environment 222. In some implementations, one application 224-1 may send/receive information to/from one or more other applications 224-1, via the virtual machine 224-2.

The virtual machine 224-2 includes a software implementation of a machine (e.g., a computer) that executes programs like a physical machine. The virtual machine 224-2 may be either a system virtual machine or a process virtual machine, depending upon use and degree of correspondence to any real machine by the virtual machine 224-2. A system virtual machine may provide a complete system platform that supports execution of a complete operating system ("OS"). A process virtual machine may execute a single program, and may support a single process. In some implementations, the virtual machine 224-2 may execute on behalf of a user (e.g., the user device 210), and may manage infrastructure of the cloud computing environment 222, such as data management, synchronization, or long-duration data transfers.

The virtualized storage 224-3 includes one or more storage systems and/or one or more devices that use virtualization techniques within the storage systems or devices of the computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 224-4 may provide hardware virtualization techniques that allow multiple operating systems (e.g., "guest operating systems") to execute concurrently on a host computer, such as the computing resource 224. The hypervisor 224-4 may present a virtual operating platform to the guest operating systems, and may manage the execution of the guest operating systems. Multiple instances of a variety of operating systems may share virtualized hardware resources.

The network 230 includes one or more wired and/or wireless networks. For example, the network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
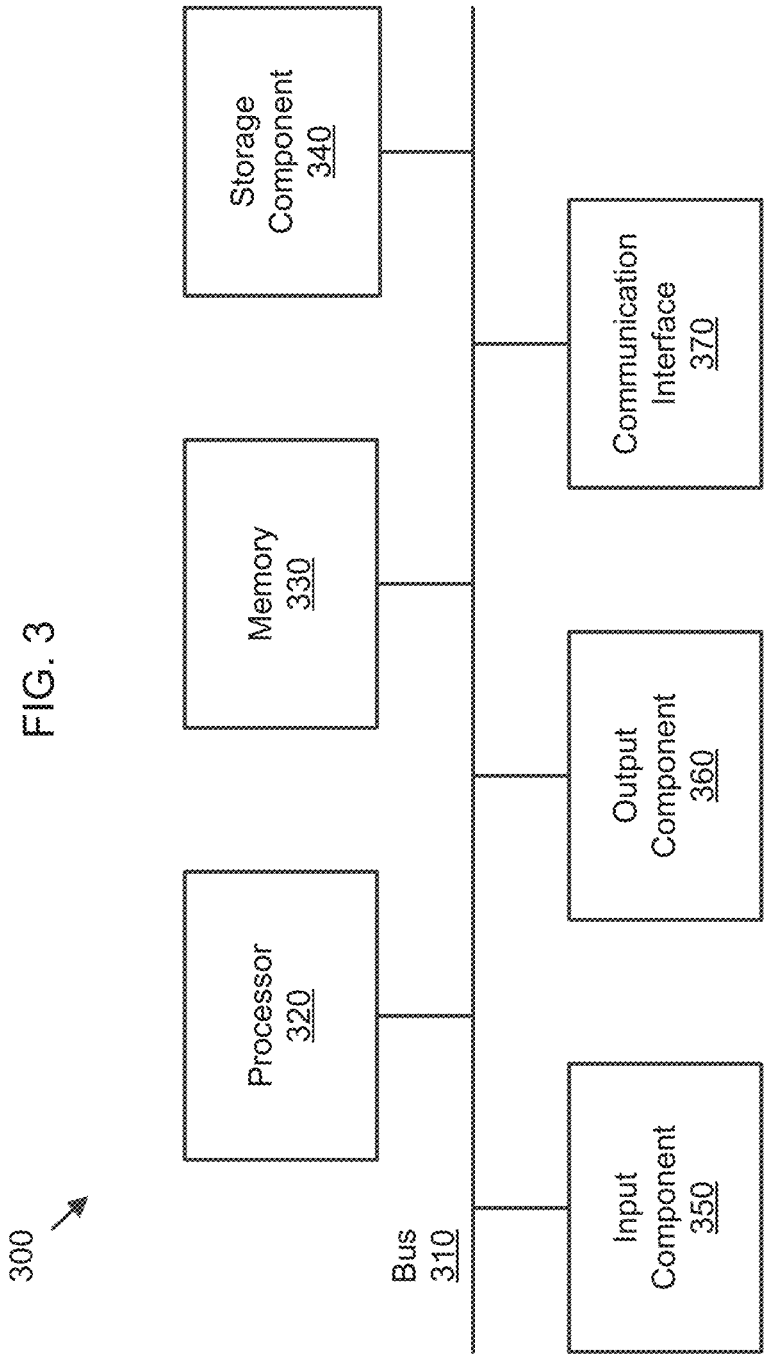
FIG. 3 is a block diagram of example components of one or more devices of FIG. 2.

FIG. 3 is a block diagram of example components of one or more devices of FIG. 2. The device 300 may correspond to the user device 210 and/or the platform 220. As shown in FIG. 3, device 300 may include a bus 310, a processor 320, a memory 330, a storage component 340, an input component 350, an output component 360, and a communication interface 370.

The bus 310 includes a component that permits communication among the components of the device 300. The processor 320 is implemented in hardware, firmware, or a combination of hardware and software. The processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 320 includes one or more processors capable of being programmed to perform a function. The memory 330 includes a random access memory (RAM), a read only memory (ROM), and/or another type of dynamic or static storage device (e.g., a flash memory, a magnetic memory, and/or an optical memory) that stores information and/or instructions for use by the processor 320.

The storage component 340 stores information and/or software related to the operation and use of the device 300. For example, the storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 350 includes a component that permits the device 300 to receive information, such as via user input (e.g., a touch screen display, a keyboard, a keypad, a mouse, a button, a switch, and/or a microphone). Additionally, or alternatively, the input component 350 may include a sensor for sensing information (e.g., a global positioning system (GPS) component, an accelerometer, a gyroscope, and/or an actuator). The output component 360 includes a component that provides output information from the device 300 (e.g., a display, a speaker, and/or one or more light-emitting diodes (LEDs)).

The communication interface 370 includes a transceiver-like component (e.g., a transceiver and/or a separate receiver and transmitter) that enables the device 300 to communicate with other devices, such as via a wired connection, a wireless connection, or a combination of wired and wireless connections. The communication interface 370 may permit the device 300 to receive information from another device and/or provide information to another device. For example, the communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

The device 300 may perform one or more processes described herein. The device 300 may perform these processes in response to the processor 320 executing software instructions stored by a non-transitory computer-readable medium, such as the memory 330 and/or the storage component 340. A computer-readable medium is defined herein as a non-transitory memory device. A memory device includes memory space within a single physical storage device or memory space spread across multiple physical storage devices.

Software instructions may be read into the memory 330 and/or the storage component 340 from another computer-readable medium or from another device via the communication interface 370. When executed, software instructions stored in the memory 330 and/or the storage component 340 may cause the processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, the device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4A:
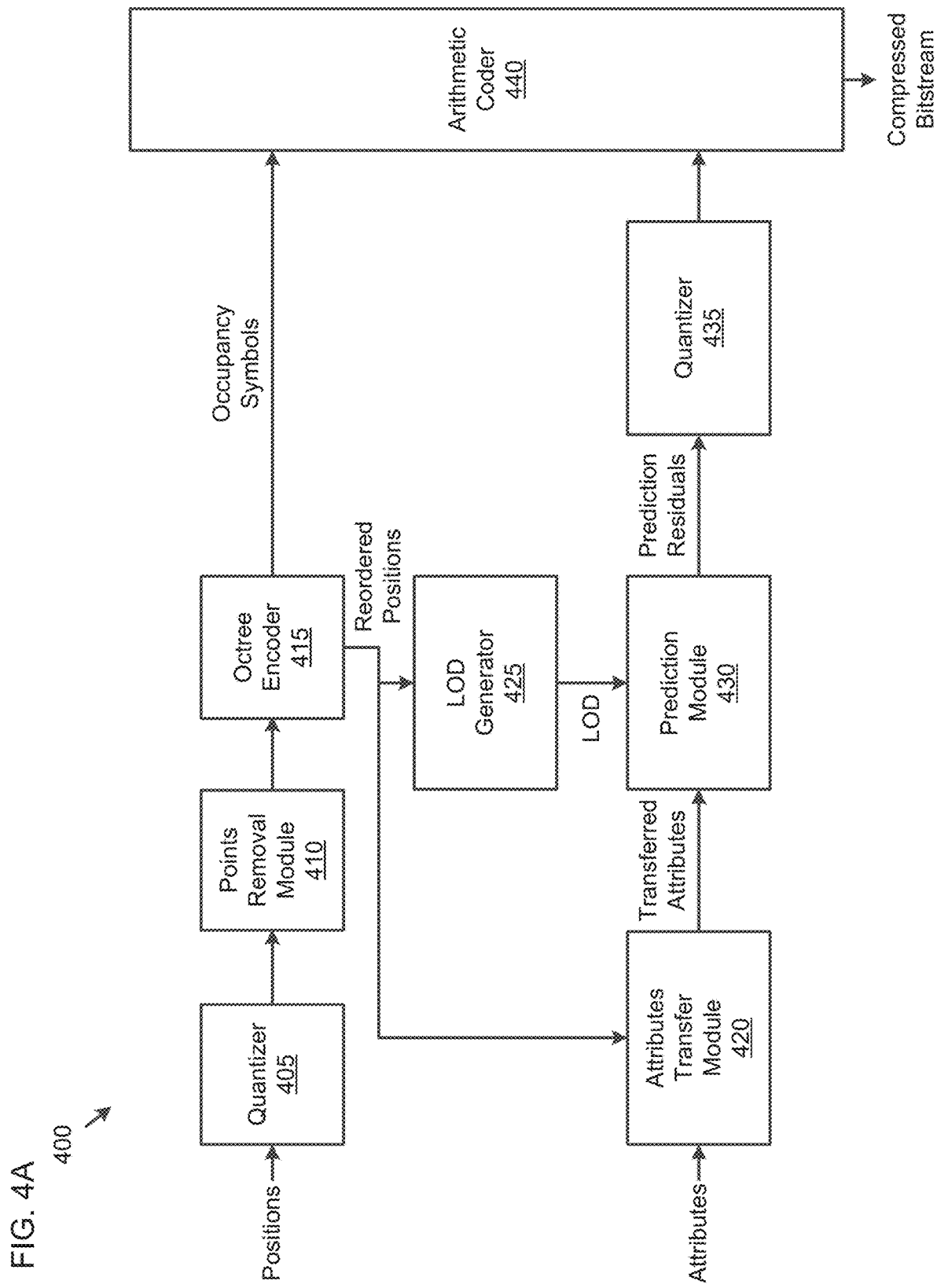
FIG. 4A is a functional block diagram of the G-PCC compressor according to embodiments.

FIG. 4A is a functional block diagram of a G-PCC compressor 400 according to embodiments.

As shown in FIG. 4A, the G-PCC compressor 400 includes a quantizer 405, a points removal module 410, an octree encoder 415, an attributes transfer module 420, an LoD generator 425, a prediction module 430, a quantizer 435 and an arithmetic coder 440.

The quantizer 405 receives positions of points in an input point cloud. The positions may be (x,y,z)-coordinates. The quantizer 405 further quantizes the received positions, using, e.g., a scaling algorithm and/or a shifting algorithm.

The points removal module 410 receives the quantized positions from the quantizer 405, and removes or filters duplicate positions from the received quantized positions.

The octree encoder 415 receives the filtered positions from the points removal module 410, and encodes the received filtered positions into occupancy symbols of an octree representing the input point cloud, using an octree encoding algorithm. A bounding box of the input point cloud corresponding to the octree may be any 3D shape, e.g., a cube.

The octree encoder 415 further reorders the received filtered positions, based on the encoding of the filtered positions.

The attributes transfer module 420 receives attributes of points in the input point cloud. The attributes may include, e.g., a color or RGB value and/or a reflectance of each point. The attributes transfer module 420 further receives the reordered positions from the octree encoder 415.

The attributes transfer module 420 further updates the received attributes, based on the received reordered positions. For example, the attributes transfer module 420 may perform one or more among pre-processing algorithms on the received attributes, the pre-processing algorithms including, for example, weighting and averaging the received attributes and interpolation of additional attributes from the received attributes. The attributes transfer module 420 further transfers the updated attributes to the prediction module 430.

The LoD generator 425 receives the reordered positions from the octree encoder 415, and obtains an LoD of each of the points corresponding to the received reordered positions. Each LoD may be considered to be a group of the points, and may be obtained based on a distance of each of the points. For example, points P0, P5, P4 and P2 may be in an LoD LOD0, points P0, P5, P4, P2, P1, P6 and P3 may be in an LoD LOD1, and points P0, P5, P4, P2, P1, P6, P3, P9, P8 and P7 may be in an LoD LOD2.

The prediction module 430 receives the transferred attributes from the attributes transfer module 420, and receives the obtained LoD of each of the points from the LoD generator 425. The prediction module 430 obtains prediction residuals (values) respectively of the received attributes by applying a prediction algorithm to the received attributes in an order based on the received LoD of each of the points. The prediction algorithm may include any among various prediction algorithms such as, e.g., interpolation, weighted average calculation, a nearest neighbor algorithm and RDO.

For example, the prediction residuals respectively of the received attributes of the points P0, P5, P4 and P2 included in the LoD LOD0 may be obtained first prior to those of the received attributes of the points P1, P6, P3, P9, P8 and P7 included respectively in the LoDs LOD1 and LOD2. The prediction residuals of the received attributes of the point P2 may be obtained by calculating a distance based on a weighted average of the points P0, P5 and P4.

The quantizer 435 receives the obtained prediction residuals from the prediction module 430, and quantizes the received predicted residuals, using, e.g., a scaling algorithm and/or a shifting algorithm.

The arithmetic coder 440 receives the occupancy symbols from the octree encoder 415, and receives the quantized prediction residuals from the quantizer 435. The arithmetic coder 440 performs arithmetic coding on the received occupancy symbols and quantized predictions residuals to obtain a compressed bitstream. The arithmetic coding may include any among various entropy encoding algorithms such as, e.g., context-adaptive binary arithmetic coding.

Figure 4B:
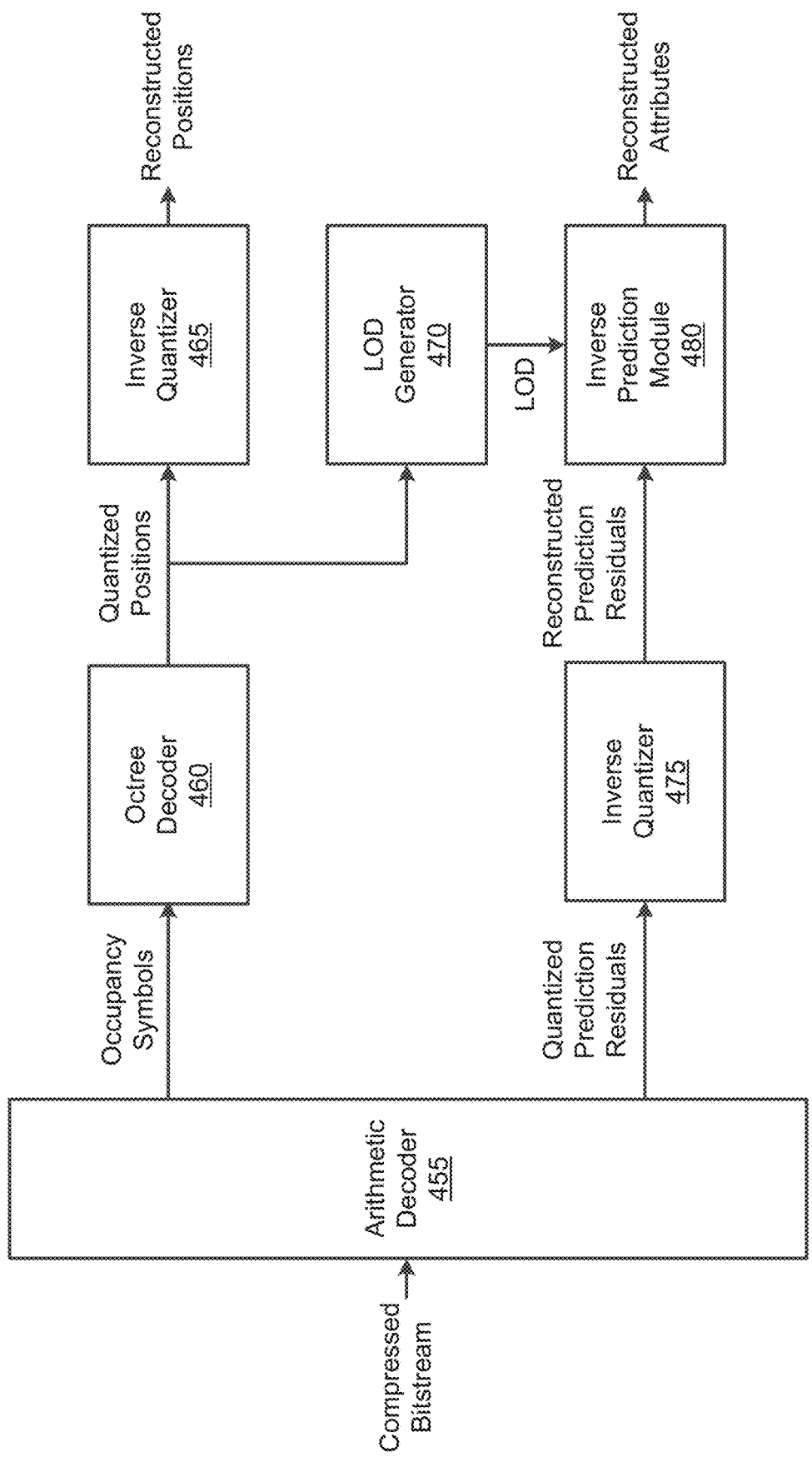
FIG. 4B is a functional block diagram of the G-PCC decompressor according to embodiments.

FIG. 4B is a functional block diagram of a G-PCC decompressor 450 according to embodiments.

As shown in FIG. 4B, the G-PCC decompressor 450 includes an arithmetic decoder 455, an octree decoder 460, an inverse quantizer 465, an LoD generator 470, an inverse quantizer 475 and an inverse prediction module 480.

The arithmetic decoder 455 receives the compressed bitstream from the G-PCC compressor 400, and performs arithmetic decoding on the received compressed bitstream to obtain the occupancy symbols and the quantized prediction residuals. The arithmetic decoding may include any among various entropy decoding algorithms such as, e.g., context-adaptive binary arithmetic decoding.

The octree decoder 460 receives the obtained occupancy symbols from the arithmetic decoder 455, and decodes the received occupancy symbols into the quantized positions, using an octree decoding algorithm.

The inverse quantizer 465 receives the quantized positions from the octree decoder 460, and inverse quantizes the received quantized positions, using, e.g., a scaling algorithm and/or a shifting algorithm, to obtain reconstructed positions of the points in the input point cloud.

The LoD generator 470 receives the quantized positions from the octree decoder 460, and obtains the LoD of each of the points corresponding to the received quantized positions.

The inverse quantizer 475 receives the obtained quantized prediction residuals, and inverse quantizes the received quantized prediction residuals, using, e.g., a scaling algorithm and/or a shifting algorithm, to obtain reconstructed prediction residuals.

The inverse prediction module 480 receives the obtained reconstructed prediction residuals from the inverse quantizer 475, and receives the obtained LoD of each of the points from the LoD generator 470. The inverse prediction module 480 obtains reconstructed attributes respectively of the received reconstructed prediction residuals by applying a prediction algorithm to the received reconstructed prediction residuals in an order based on the received LoD of each of the points. The prediction algorithm may include any among various prediction algorithms such as, e.g., interpolation, weighted average calculation, a nearest neighbor algorithm and RDO. The reconstructed attributes are of the points in the input point cloud.

Methods and apparatuses for a geometry merge mode for PCC will now be described in detail. This disclosure is not limited to TMC13 software or the MPEG G-PCC standard, and may be a solution for most PCC systems. In the following descriptions, all texts underlined indicate possible changes in the latest MPEG G-PCC standard specifications.

I. Candidate List Construction for Merge Mode

In this section, methods of candidate list construction for a merge mode is presented. The methods may be done in an exactly same manner for an encoder (e.g., the G-PCC compressor 400) and a decoder (e.g., the G-PCC decompressor 450) to avoid mismatches.

To enable a merge mode, a candidate list is constructed for a current coded node. The candidate list consists of available occupancy codes derived from already-coded nodes or default tables. The already-coded nodes include those in a current point cloud frame (a spatial reference) and those in previously-encoded frames (a temporal reference). Candidate nodes can be in the same partition depth as the current node or a lower partition depth (i.e., parent and grandparent nodes) of the current node. Let CandList={$S_1, S_2, \ldots, S_N$} be the constructed candidate list containing N different occupancy codes, which are derived from the already-coded nodes. When one candidate $S_i$ is about to be added to the list, a unique check is performed to make sure that $S_i$ is different from elements that are already in the list, i.e., $S_i \neq S_j$ if $i \neq j$.

To fill the candidate list, the occupancy code can be derived from all nodes that are encoded before current node. The following sections list embodiments.

A. Spatially Adjacent Coded Nodes in the Same Depth

A candidate node can be a coded node that is spatially adjacent to a current node in the same partition depth. The candidate node and the current node may be from the same parent node or from different parent nodes. A position of an available candidate node depends on a coding order of octree nodes.

Figure 4C:
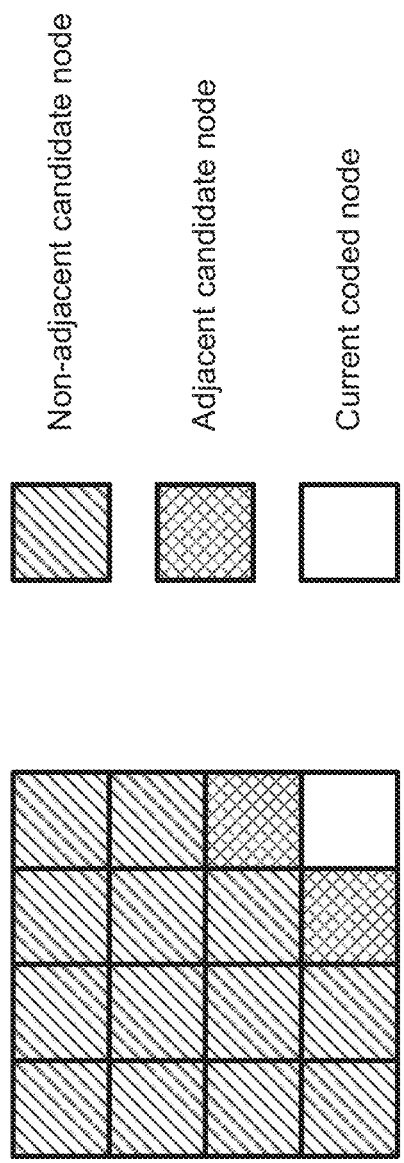
FIG. 4C is a diagram of adjacent and non-adjacent candidate nodes in the same depth, according to embodiments.

FIG. 4C is a diagram of adjacent and non-adjacent candidate nodes in the same depth, according to embodiments.

Referring to FIG. 4C, the adjacent candidate nodes to a current coded node are top and left neighbors.

Figure 1C:
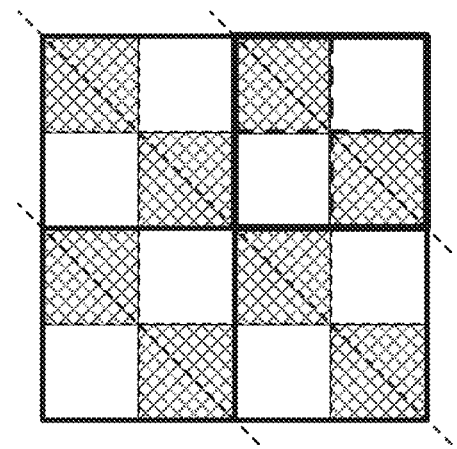
FIG. 1C is a diagram of repeating line structures creating repeating patterns of occupancy bodes in 2D.
Figure 1A:
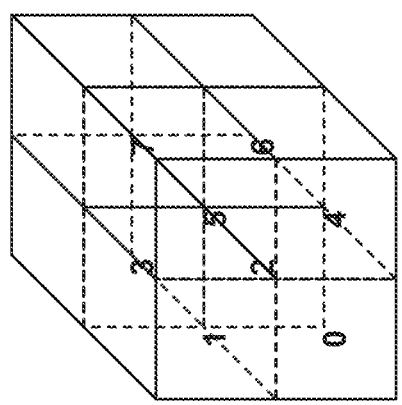
FIG. 1A is a diagram of octree partition in a 3D space.
Figure 1B:
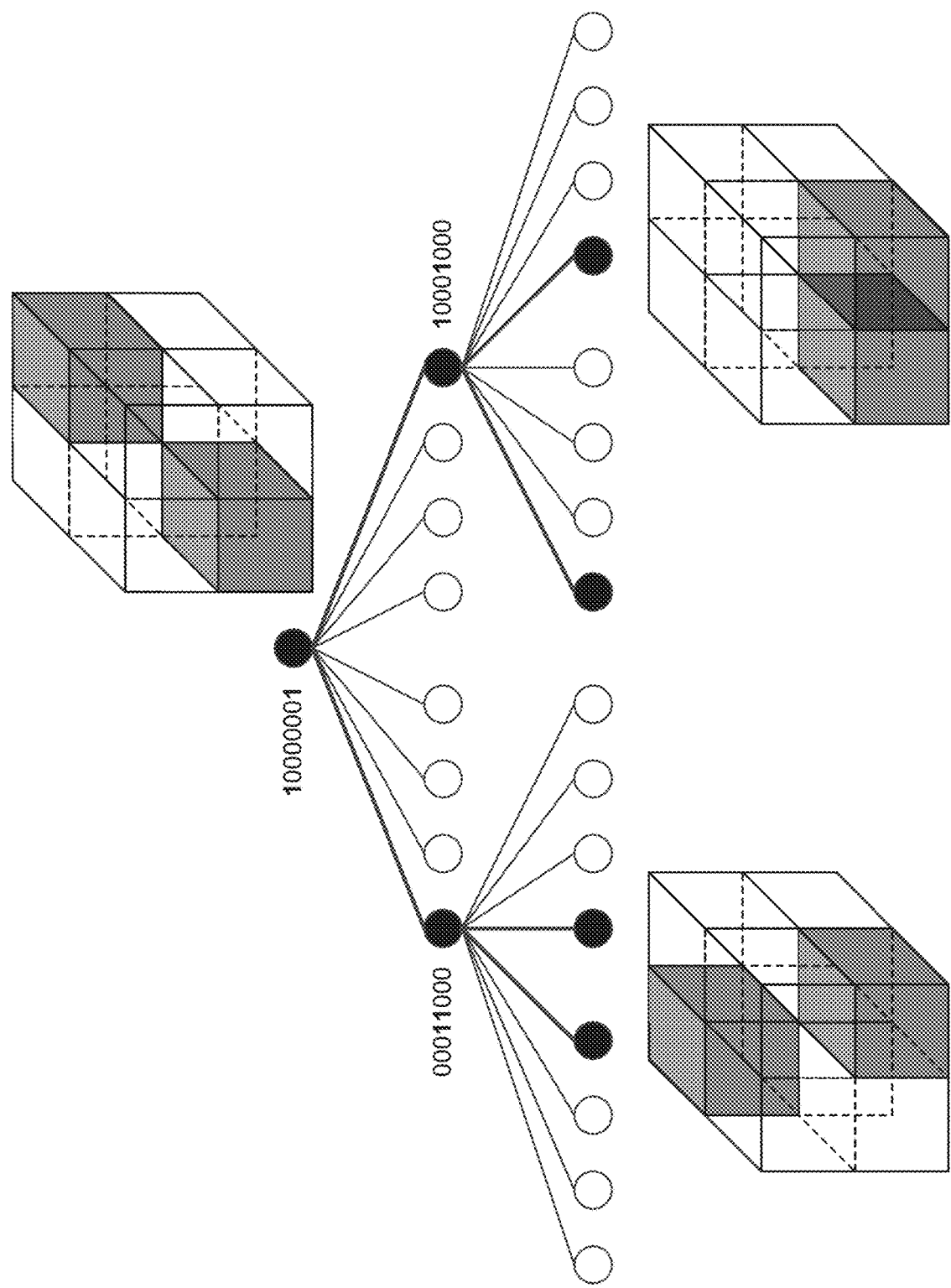
FIG. 1B is a diagram of an octree partition and its tree structure.

In one embodiment, octree nodes are coded in a breadth-first order specified by the Morton code as shown in FIG. 1A. Available candidate nodes include left, below and front adjacent nodes of a current node, and their occupancy code can be added to a candidate list, i.e., CandList.

In another embodiment, octree nodes are coded in a breadth-first order specified by the inverse Morton code. Available candidate nodes include right, above and back adjacent nodes of a current node, and their occupancy code can be added to a candidate list, i.e., CandList.

B. Spatially Non-Adjacent Coded Nodes in the Same Depth

A candidate node can be a coded node that is spatially non-adjacent to a current node in the same partition depth.

In one embodiment, a cache is maintained to record a last-observed different occupancy code. Every occupancy code in the cache can be added to a candidate list, i.e., CandList. In this case, a candidate node can be adjacent, non-adjacent or even far from a current node. A maximum size of the cache can be either fixed or specified in a header of a bitstream.

In another embodiment, candidate nodes are from fixed non-adjacent positions relative to a current node. A 2D illustration is shown in FIG. 4C, in which an occupancy code from the non-adjacent candidate nodes can be added to a candidate list, i.e., CandList.

C. Parent Node and Grandparent Node

A candidate node can be a parent node or a grandparent node of a current node, i.e., nodes containing the current node but with a smaller depth.

In one embodiment, an occupancy code of a parent node of a current node can be added to a candidate list, i.e., CandList.

In another embodiment, an occupancy code of both parent and grandparent nodes of a current node can be added to a candidate list, i.e., CandList.

D. Nodes in Previous Coded Frames

Candidate nodes can be in previous coded frames. The previous coded frames can be adjacent to a current frame or non-adjacent to the current frame. Depending on different inter-frame reference structures, the previous coded frames can have a smaller or larger timestamp than the current frame, i.e., they can be in front or behind the current frame in terms of a display order. All occupancy codes in the previous coded frames can be added to a candidate list, i.e., CandList.

In one embodiment, only an occupancy code of a collocated node in previous coded frames can be added to a candidate list, i.e., CandList. The collocated node in the previous coded frames is in the same depth and has the same Morton code as a current coded node.

In another embodiment, in addition to a collocated node, occupancy codes of neighboring nodes of the collocated node in previous coded frames can be added to a candidate list, i.e., CandList. The neighboring nodes can be adjacent or non-adjacent to the collocated node in the previous coded frames.

In another embodiment, in addition to a collocated node, occupancy code of neighboring nodes and a parent node of the collocated node in previous coded frames can be added to a candidate list, i.e., CandList. A grandparent node of the collocated node in the previous coded frames can be also included in the candidate list in another embodiment.

In another embodiment, motion compensation is applied between point cloud frames. In this case, a node indicated by a motion vector in previous coded frames with the same depth as a current node can be added to a candidate list, i.e., CandList.

E. Default Occupancy Code

A default occupancy code can be added into a candidate list. A table can be maintained containing all default occupancy codes.

In one embodiment, a table is predefined and fixed. Occupancy codes in the table are added to a candidate list in a fixed order.

In another embodiment, a table is sorted according to a frequency of each occupancy code. Therefore, the table is adaptively updated whenever an occupancy code is observed. Each time, an occupancy code with the highest frequency is added to a candidate list.

Candidate nodes described in the above embodiments can be added to a candidate list in any order until the list is full. After construction, the candidate list can be further sorted by a frequency of occurrence to make sure an occupancy code with a higher probability of occurrence will be in front of that with a lower probability.

II. Signaling of Merge Mode

In this section, signaling methods of a merge mode are described.

A. Signaling Parameters for Merge Mode in High Level Syntax

Parameters that will be used in a merge mode can be signaled in a high level syntax. Examples are given below, but the disclosure is not limited to these examples, other parameters can be signaled as well. They can be specified in a sequence header, a slice header or a geometry parameter set of a bitstream.

First, a flag can be signaled indicating whether a merge mode is enabled or disabled.

In one embodiment, a flag is specified in a geometry parameter set in TMC13 as follows in Table 1:

TABLE 1

| | Descriptor |
|---|---|
| geometry_parameter_set( ) { | |
|   gps_geom_parameter_set_id | ue(v) |
|   gps_seq_parameter_set_id | ue(v) |
|   gps_box_present_flag | u(1) |
|   if(gps_box_present_flag){ | |
|     gps_gsh_box_log2_scale_present_flag | u(1) |
|     if(gps_gsh_box_log2_scale_present_flag == 0) | |
|       gps_gsh_box_log2_scale | ue(v) |
|   } | |
|   unique_geometry_points_flag | u(1) |
|   neighbour_context_restriction_flag | u(1) |
|   inferred_direct_coding_mode_enabled_flag | u(1) |
|   bitwise_occupancy_coding_flag | u(1) |
|   adjacent_child_contextualization_enabled_flag | u(1) |
|   log2_neighbour_avail_boundary | ue(v) |
|   log2_intra_pred_max_node_size | ue(v) |
|   log2_trisoup_node_size | ue(v) |
|   gps_merge_mode_flag | u(1) |
|   gps_extension_present_flag | u(1) |
|   if(gps_extension_present_flag) | |
|     while(more_data_in_byte_stream( )) | |
|       gps_extension_data_flag | u(1) |
|   byte_alignment( ) | |
| } | | gps_merge_mode_flag equal to 1 specifies that the merge mode is enabled for a sequence or slice. gps_merge_mode_flag equal to 0 specifies that the merge mode is disabled for the sequence or slice.

Second, a maximum size of a candidate list, i.e., N, is either fixed or specified by syntax.

In one embodiment, a maximum size of a candidate list, i.e., N, is specified by merge_list_max_size_minus_one in a geometry parameter set in TMC13 as follows in Table 2:

TABLE 2

| | Descriptor |
|---|---|
| geometry_parameter_set( ) { | |
|   gps_geom_parameter_set_id | ue(v) |
|   ... | ... |
|   log2_trisoup_node_size | ue(v) |
|   gps_merge_mode_flag | u(1) |
|   if (gps_merge_mode_flag) | |
|     merge_list_max_size_minus_one | ue(v) |
|   ... | ... |
|   byte_alignment( ) | |
| } | | merge_list_max_size_minus_one specifies the maximum size of the candidate list as follows in Equation 1:

$$MergeListMaxSize = merge\_list\_max\_size\_minus\_one + 1. \quad (1)$$

In another embodiment, a maximum size of a candidate list, i.e., N, is specified by merge_list_max_size in a geometry parameter set in TMC13 as follows in Table 3:

TABLE 3

| | Descriptor |
|---|---|
| geometry_parameter_set( ) { | |
|   gps_geom_parameter_set_id | ue(v) |
|   ... | ... |
|   log2_trisoup_node_size | ue(v) |
|   merge_list_max_size | ue(v) |
|   ... | ... |
|   byte_alignment( ) | |
| } | | merge_list_max_size specifies the maximum size of the candidate list as follows in Equation 2:

$$MergeListMaxSize = merge\_list\_max\_size. \quad (2)$$

In this case, gps_merge_mode_flag is not signaled but can be inferred from a value of merge_list_max_size. If merge_list_max_size is equal to zero, gps_merge_mode_flag is inferred to be 0; otherwise, gps_merge_mode_flag is inferred to be 1.

Third, a merge mode can be only enabled at certain depths of an octree partition. Therefore, one or two parameters can be either fixed or signaled to indicate minimum and maximum depths that allow the merge mode.

In one embodiment, minimum and maximum depths of a merge mode are signaled in a geometry parameter set in TMC13 as follows in Table 4:

TABLE 4

| | Descriptor |
|---|---|
| geometry_parameter_set( ) { | |
|   gps_geom_parameter_set_id | ue(v) |
|   ... | ... |
|   log2_trisoup_node_size | ue(v) |
|   gps_merge_mode_flag | u(1) |
|   if (gps_merge_mode_flag) | |
|     merge_list_max_size_minus_one | ue(v) |
|     merge_min_depth | ue(v) |
|     merge_max_depth | ue(v) |
|   ... | ... |
|   byte_alignment( ) | |
| } | | merge_min_depth specifies a minimum octree partition depth that enables the merge mode. merge_max_depth specifies a maximum octree partition depth that enables the merge mode. The merge mode is only enabled when a octree partition depth is between a specified range.

In another embodiment, only a minimum depth of a merge mode is signaled in a geometry parameter set in TMC13 as follows in Table 5:

TABLE 5

| | Descriptor |
|---|---|
| geometry_parameter_set( ) { | |
|   gps_geom_parameter_set_id | ue(v) |
|   ... | ... |
|   log2_trisoup_node_size | ue(v) |
|   gps_merge_mode_flag | u(1) |
|   if (gps_merge_mode_flag) | |
|     merge_list_max_size_minus_one | ue(v) |
|     merge_min_depth | ue(v) |
|   ... | ... |
|   byte_alignment( ) | |
| } | |

In another embodiment, only a maximum depth of a merge mode is signaled in a geometry parameter set in TMC13 as follows in Table 6:

TABLE 6

| | Descriptor |
|---|---|
| geometry_parameter_set( ) { | |
|   gps_geom_parameter_set_id | ue(v) |
|   ... | ... |
|   log2_trisoup_node_size | ue(v) |
|   gps_merge_mode_flag | u(1) |
|   if (gps_merge_mode_flag) | |
|     merge_list_max_size_minus_one | ue(v) |
|     merge_max_depth | ue(v) |
|   ... | ... |
|   byte_alignment( ) | |
| } | |

In another embodiment, a merge mode is only allowed at a certain octree partition depth. Therefore, a depth number is signaled in a geometry parameter set in TMC13 as follows in Table 7:

TABLE 7

| | Descriptor |
|---|---|
| geometry_parameter_set( ) { | |
|   gps_geom_parameter_set_id | ue(v) |
|   ... | ... |
|   log2_trisoup_node_size | ue(v) |

TABLE 7-continued

| | Descriptor |
|---|---|
|   gps_merge_mode_flag | u(1) |
|   if (gps_merge_mode_flag) | |
|     merge_list_max_size_minus_one | ue(v) |
|     merge_present_depth | ue(v) |
|   ... | ... |
|   byte_alignment( ) | |
| } | | merge_present_depth specifies the octree partition depth in which the merge mode is enabled.

Fourth, one flag can be signaled to indicate whether encoding a difference between an occupancy code of a current node and a derived one from a candidate list is enabled.

In one embodiment, a flag is signaled at a geometry parameter set in TMC13 as follow in Table 8:

TABLE 8

| | Descriptor |
|---|---|
| geometry_parameter_set( ) { | |
|   gps_geom_parameter_set_id | ue(v) |
|   ... | ... |
|   log2_trisoup_node_size | ue(v) |
|   gps_merge_mode_flag | u(1) |
|   if (gps_merge_mode_flag) | |
|     merge_list_max_size_minus_one | ue(v) |
|     merge_min_depth | ue(v) |
|     merge_max_depth | ue(v) |
|     gps_merge_signal_diff_flag | u(1) |
|   ... | ... |
|   byte_alignment( ) | |
| } | | gps_merge_signal_diff_flag specifies whether signaling a difference between an occupancy code of a current node and a derived one from a candidate list is enabled.

B. Signaling Merge Mode without Signaling Differences

In a merge mode, conditions are checked whether the merge mode is enabled for a current coded node. If it is enabled, one flag is first signaled to indicate whether the merge mode is applied to the current node. If yes, one index is then signaled to refer to an occupancy code in a constructed candidate list, which is inferred as an occupancy code of current node. Otherwise, the occupancy code of current node is signaled and coded by a byte-wise encoding method or a bit-wise encoding method.

In the following embodiments, a modification to a syntax table in TMC13 is as follows in Table 9:

TABLE 9

| | Descriptor |
|---|---|
| geometry_node(depth, nodeIdx, xN, yN, zN) { | |
|   if(NeighbourPattern == 0) { | |
|     single_occupancy_flag | ae(v) |
|     if(single_occupancy_flag) | |
|       occupancy_idx | ae(v) |
|   } | |
|   if(!single_occupancy_flag) | |
|     if(bitwise_occupancy_flag) | |
|       if(MergeModeFlagPresent) | |
|         merge_mode_flag | ae(v) |
|       if(merge_mode_flag && MergeListMaxSize > 1) | |
|         merge_mode_idx | ae(v) |
|       else | |
|         occupancy_map | ae(v) |

TABLE 9-continued

| | Descriptor |
|---|---|
| ```
        else
            occupancy_byte
        if(depth = = MaxGeometryOctreeDepth - 1)
            if(!unique_geometry_points_flag)
                for(child = 0; child < GeometryNodeChildrenCnt; child++) {
                    num_points_eq1_flag[child]
                    if(!num_points_eq1_flag)
                        num_points_minus2[child]
                }
    } else {
        if(DirectModeFlagPresent)
            direct_mode_flag
        if(direct_mode_flag) {
            num_direct_points_minus1
            for(i = 0; i <= num_direct_points_minus1; i++)
                for(j = 0; j < ChildNodeSizeLog2; j++) {
                    point_offset_x[i][j]
                    point_offset_y[i][j]
                    point_offset_z[i][j]
                }
        }
    }
}
``` | de(v)<br><br><br><br>ae(v)<br><br>ae(v)<br><br><br><br>ae(v)<br><br>ae(v)<br><br><br>ae(v)<br>ae(v)<br>ae(v) | merge_mode_flag equal to 1 specifies a merge mode is applied for a current node, and an occupancy code is derived from a candidate list. merge_mode_flag equal to 0 specifies the merge mode is not applied for the current node, and the occupancy code is coded directly in a bitstream.

merge_mode_idx specifies an index to the candidate list; therefore the occupancy code of the current node can be inferred as $S_{merge\_mode\_idx}$. merge_mode_idx is signaled only when merge_mode_flag is 1 and a maximum size of the candidate list, i.e., MergeListMaxSize, is larger than 1. merge_mode_idx can be binarized and encoded in various ways. In one embodiment, it is encoded as follows: one flag is first coded to indicate whether merge_mode_idx equals to 0. If not, another flag is then coded to indicate whether merge_mode_idx equals to 1. If not, the merge_mode_idx-2 is coded by an Exp-Golomb code.

The variable MergeModeFlagPresent determines whether the merge mode is enabled for the current node. Different conditions can be set as the following embodiments:

In one embodiment, the variable MergeModeFlagPresent depends on gps_merge_mode_flag, merge_min_depth and merge_max_depth as specified in high level syntax as follows:

```
if (gps_merge_mode_flag && depth >= merge_min_depth && depth <=
merge_max_depth)
    MergeModeFlagPresent = 1
else
    MergeModeFlagPresent = 0
```

In another embodiment, the variable MergeModeFlagPresent depends on gps_merge_mode_flag and merge_min_depth as specified in high level syntax as follows:

```
if (gps_merge_mode_flag && depth >= merge_min_depth)
    MergeModeFlagPresent = 1
else
    MergeModeFlagPresent = 0
```

In another embodiment, the variable MergeModeFlagPresent depends on gps_merge_mode_flag and merge_max_depth as specified in high level syntax as follows:

```
if (gps_merge_mode_flag && depth <= merge_max_depth)
    MergeModeFlagPresent = 1
else
    MergeModeFlagPresent = 0
```

In another embodiment, the variable MergeModeFlagPresent depends on merge_list_max_size as specified in high level syntax as follows:

```
if (merge_list_max_size > 0)
    MergeModeFlagPresent = 1
else
    MergeModeFlagPresent = 0
```

In another embodiment, the variable MergeModeFlagPresent depends on gps_merge_mode_flag and merge_present_depth as specified in high level syntax as follows:

```
if (gps_merge_mode_flag && depth == merge_present_depth)
    MergeModeFlagPresent = 1
else
    MergeModeFlagPresent = 0
```

In another embodiment, none of the above parameters is specified; therefore MergeModeFlagPresent is always 1.

Other conditions and parameters can be set to determine the value of MergeModeFlagPresent, but are not limited to the above embodiments.

C. Signaling Merge Mode with Signaling Differences

In addition, differences between an occupancy code of a current node and that in a candidate list can be further signaled, if enabled. Conditions and constrains can be set for signaling the differences.

In one embodiment, only a one-bit difference is allowed between an occupancy code of a current node and that in a candidate list; therefore a bit index in which the difference occurs is signaled. A syntax table in TMC13 is as follows in Table 10:

TABLE 10

|  | Descriptor |
|---|---|
| geometry_node(depth, nodeIdx, xN, yN, zN) { |  |
|     if(NeighbourPattern = = 0) { |  |
|         single_occupancy_flag | ae(v) |
|         if(single_occupancy_flag) |  |
|             occupancy_idx | ae(v) |
|     } |  |
|     if(!single_occupancy_flag) |  |
|         if(bitwise_occupancy_flag) |  |
|             if(MergeModeFlagPresent) |  |
|                 merge_mode_flag | ae(v) |
|             if(merge_mode_flag && MergeListMaxSize > 1) |  |
|                 merge_mode_idx | ae(v) |
|             if (gps_merge_signal_diff_flag) |  |
|                 merge_signal_diff_flag | ae(v) |
|             if (merge_signal_diff_flag) |  |
|                 merge_diff_idx | u(3) |
|         else |  |
|             occupancy_map | ae(v) |
|         else |  |
|             occupancy_byte | de(v) |
|     if(depth = = MaxGeometryOctreeDepth − 1) |  |
|         if(!unique_geometry_points_flag) |  |
|             for(child = 0; child < GeometryNodeChildrenCnt; child++) { |  |
|                 num_points_eq1_flag[ child ] | ae(v) |
|                 if(!num_points_eq1_flag) |  |
|                     num_points_minus2[ child ] | ae(v) |
|             } |  |
|     } else { |  |
|         if(DirectModeFlagPresent) |  |
|             direct_mode_flag | ae(v) |
|         if(direct_mode_flag) { |  |
|             num_direct_points_minus1 | ae(v) |
|             for(i = 0; i <= num_direct_points_minus1; i++) |  |
|                 for(j = 0; j < ChildNodeSizeLog2; j++) { |  |
|                     point_offset_x[ i ][ j ] | ae(v) |
|                     point_offset_y[ i ][ j ] | ae(v) |
|                     point_offset_z[ i ][ j ] | ae(v) |
|                 } |  |
|         } |  |
|     } |  |
| } |  | merge_signal_diff_flag is signaled when gps_merge_signal_diff_flag is 1. merge_signal_diff_flag equal to 1 indicates a 1-bit difference signaling is applied to the current node. merge_signal_diff_flag equal to 0 indicates the 1-bit difference signaling is not applied to the current node. If merge_signal_diff_flag is 1, merge_diff_idx is then signaled.

merge_diff_idx specifies a bit location where a bit is flipped from the occupancy code in the candidate list. If $S_{merge\_mode\_idx}$ can be represented in an 8-bit binary form as $b_7b_6b_5b_4b_3b_2b_1b_0$, then the occupancy code of the current node is modified by one bit at a position specified by merge_diff_idx, i.e., $b_{merge\_diff\_idx}=!b_{merge\_diff\_idx}$.

In another embodiment, two bits can be flipped from a derived occupancy code in a candidate list. A syntax table in TMC13 is as follows in Table 11:

TABLE 11

|  | Descriptor |
|---|---|
| geometry_node(depth, nodeIdx, xN, yN, zN) { |  |
|     if(NeighbourPattern = = 0) { |  |
|         single_occupancy_flag | ae(v) |
|         if(single_occupancy_flag) |  |
|             occupancy_idx | ae(v) |
|     } |  |
|     if(!single_occupancy_flag) |  |
|         if(bitwise_occupancy_flag) |  |
|             if(MergeModeFlagPresent) |  |
|                 merge_mode_flag | ae(v) |
|             if(merge_mode_flag && MergeListMaxSize > 1) |  |

TABLE 11-continued

|  | Descriptor |
|---|---|
|     merge_mode_idx | ae(v) |
|     if (gps_merge_signal_diff_flag) |  |
|      merge_signal_diff_flag | ae(v) |
|      if (merge_signal_diff_flag) |  |
|       merge_diff_idx_one | u(3) |
|       merge_signal_second_diff_flag | ae(v) |
|       if (merge_signal_second_diff_flag) |  |
|        merge_diff_idx_two | u(3) |
|   else |  |
|     occupancy_map | ae(v) |
|  else |  |
|    occupancy_byte | de(v) |
|  if(depth = = MaxGeometryOctreeDepth − 1) |  |
|   if(!unique_geometry_points_flag) |  |
|    for(child = 0; child < GeometryNodeChildrenCnt; child++) { |  |
|     num_points_eq1_flag[ child ] | ae(v) |
|     if(!num_points_eq1_flag) |  |
|      num_points_minus2[ child ] | ae(v) |
|    } |  |
| } else { |  |
|  if(DirectModeFlagPresent) |  |
|   direct_mode_flag | ae(v) |
|  if(direct_mode_flag) { |  |
|   num_direct_points_minus1 | ae(v) |
|   for(i = 0; i <= num_direct_points_minus1; i++) |  |
|    for(j = 0; j < ChildNodeSizeLog2; j++) { |  |
|     point_offset_x[ i ][ j ] | ae(v) |
|     point_offset_y[ i ][ j ] | ae(v) |
|     point_offset_z[ i ][ j ] | ae(v) |
|    } |  |
|  } |  |
| } |  | merge_diff_idx_one specifies a first different bit location in the occupancy code. merge_signal_second_diff_flag equal to 1 specifies there is a second bit difference. merge_signal_second_diff_flag equal to 0 specifies there is not a second bit difference. If merge_signal_second_diff_flag equals to 1, merge_diff_idx_two specifies a second different bit location in the occupancy code. If $S_{merge\_mode\_idx}$ can be represented in an 8-bit binary form as $b_7b_6b_5b_4b_3b_2b_1b_0$, then the occupancy code of a current node is modified by one or two bits at positions specified by merge_diff_idx_one and merge_diff_idx_two, i.e., $b_{merge\_diff\_idx\_one}=!b_{merge\_diff\_idx\_one}$, $b_{merge\_diff\_idx\_two}=!b_{merge\_diff\_idx\_two}$.

Figure 5:
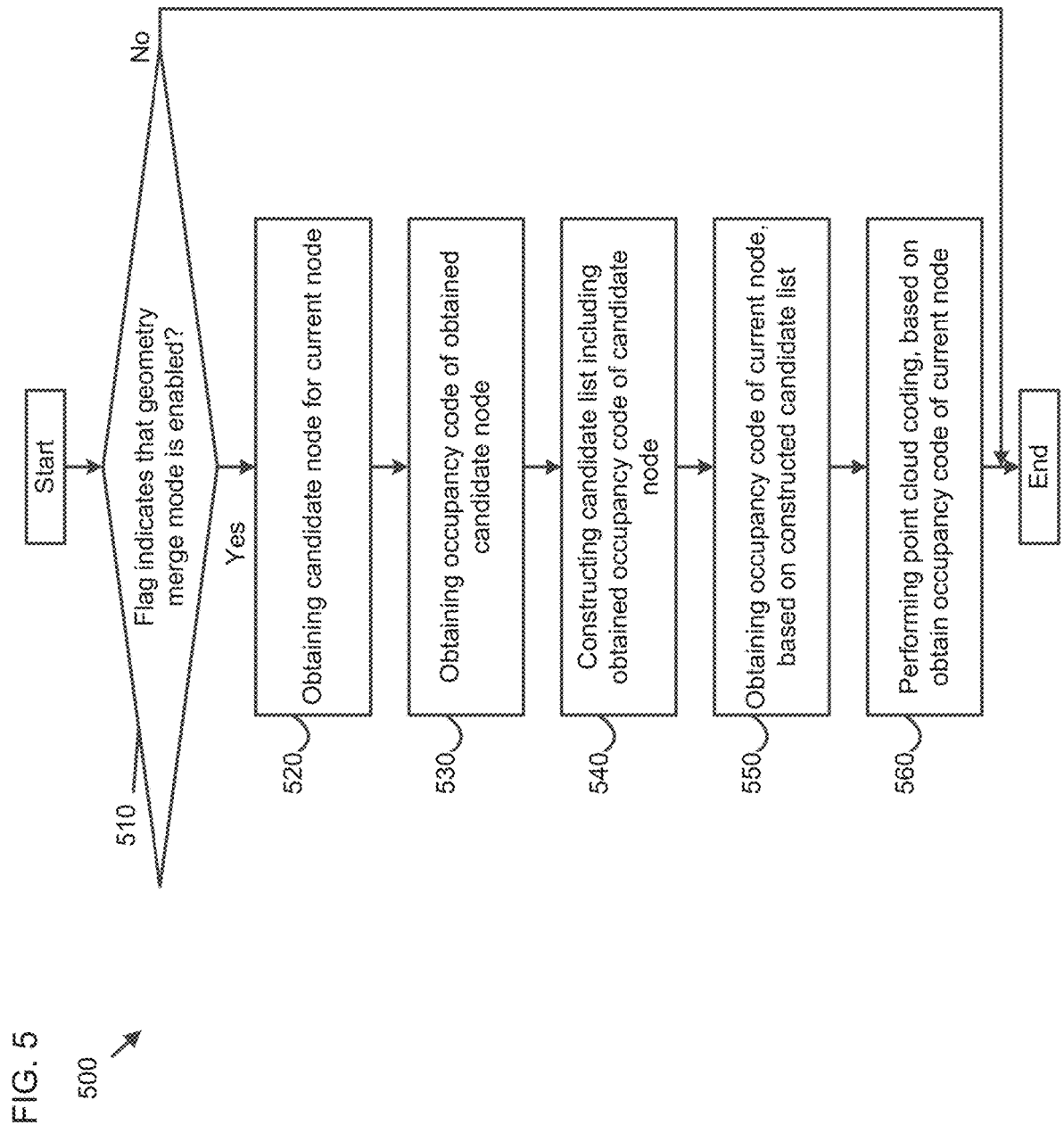
FIG. 5 is a flowchart of a method of a geometry merge mode for PCC, according to embodiments.

FIG. 5 is a flowchart of a method 500 of a geometry merge mode for PCC, according to embodiments. In some implementations, one or more process blocks of FIG. 5 may be performed by the platform 220. In some implementations, one or more process blocks of FIG. 5 may be performed by another device or a group of devices separate from or including the platform 220, such as the user device 210.

As shown in FIG. 5, in operation 510, the method 500 includes determining whether a flag indicates that the geometry merge mode is enabled. Based on the flag being determined to indicate that the geometry merge mode is enabled, the method 500 continues in operation 520. Otherwise, the method 500 ends.

In operation 520, the method 500 includes obtaining a candidate node of an octree partition of a point cloud, for a current node of the octree partition, the current node being currently-coded, and the candidate node being previously-coded.

In operation 530, the method 500 includes obtaining an occupancy code of the obtained candidate node.

In operation 540, the method 500 includes constructing a candidate list including the obtained occupancy code of the candidate node.

In operation 550, the method 500 includes obtaining an occupancy code of the current node, based on the constructed candidate list.

In operation 560, the method 500 includes performing the PCC, based on the obtained occupancy code of the current node.

The candidate node may be spatially adjacent to the current node and is in a same depth of the octree partition as the current node.

The candidate node may be predetermined, is spatially non-adjacent to the current node and is in a same depth of the octree partition as the current node.

The candidate node may be a parent node or a grandparent node of the current node.

The candidate node may be in a previously-coded frame before a currently-coded frame including the current node.

The candidate node may be obtained from a predetermined table.

The candidate list may be constructed to have a predetermined maximum size, and the geometry merge mode may be enabled for one or more predetermined depths of the octree partition.

The method 500 may further include determining whether a flag indicates a difference between the obtained occupancy code of the current node and a final occupancy code of the current node is enabled, and based on the flag being determined to indicate that the difference is enabled, modifying the obtained occupancy code of the current node. The PCC may be performed based on the modified occupancy code of the current node.

Although FIG. 5 shows example blocks of the method 500, in some implementations, the method 500 may include additional blocks, fewer blocks, different blocks, or differently arranged blocks than those depicted in FIG. 5. Additionally, or alternatively, two or more of the blocks of the method 500 may be performed in parallel.

Figure 6:
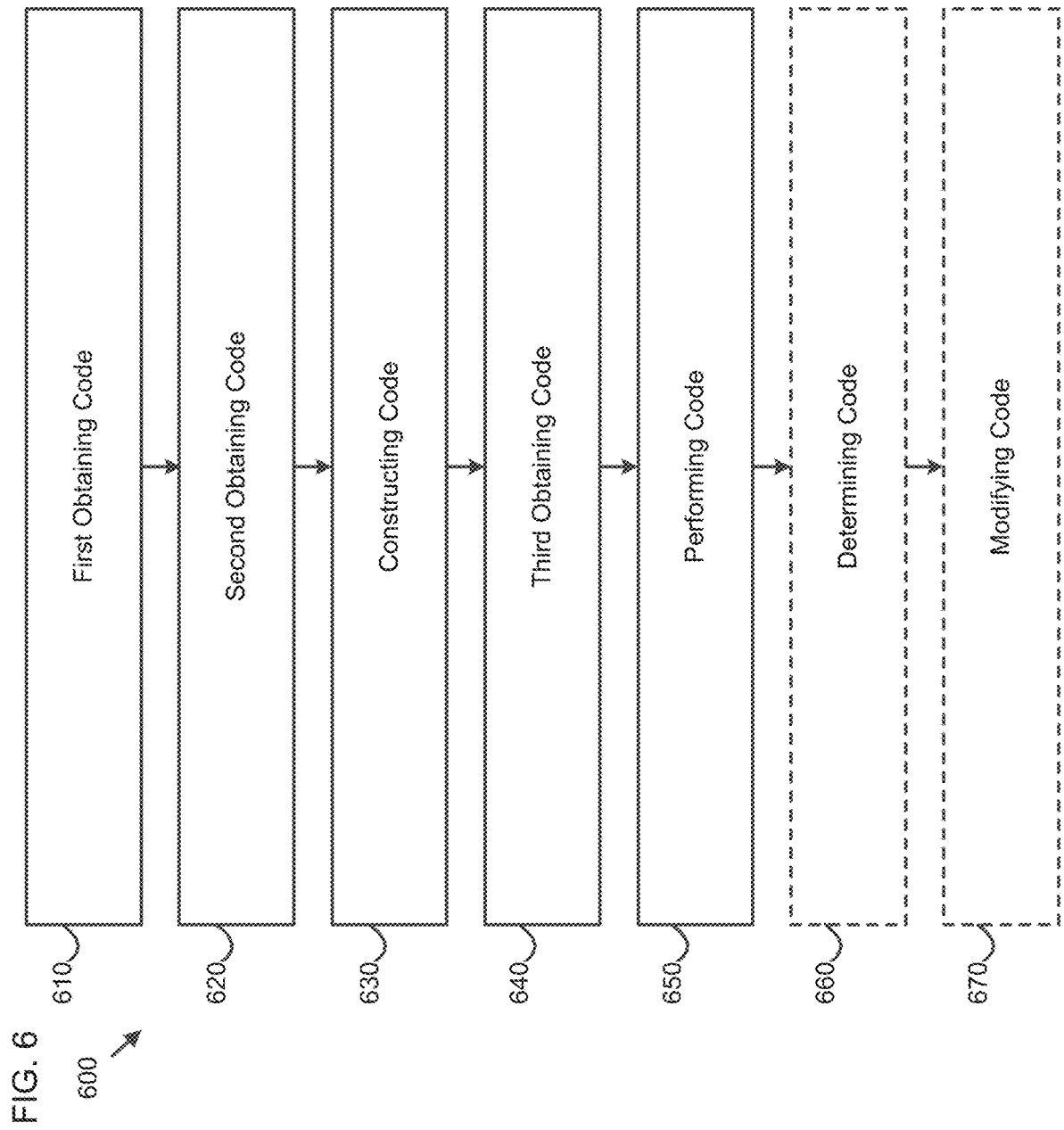
FIG. 6 is a block diagram of an apparatus for a geometry merge mode for PCC, according to embodiments.

FIG. 6 is a diagram of an apparatus 600 for a geometry merge mode for PCC, according to embodiments. As shown in FIG. 6, the apparatus 600 includes first obtaining code 610, second obtaining code 620, constructing code 630, third obtaining code 640 and performing code 650.

The first obtaining code 610 is configured to cause at least one processor to obtain a candidate node of an octree partition of a point cloud, for a current node of the octree partition, the current node being currently-coded, and the candidate node being previously-coded.

The second obtaining code 620 is configured to cause the at least one processor to obtain an occupancy code of the obtained candidate node.

The constructing code 630 is configured to cause the at least one processor to construct a candidate list including the obtained occupancy code of the candidate node.

The third obtaining code 640 is configured to cause the at least one processor to obtain an occupancy code of the current node, based on the constructed candidate list.

The performing code 650 is configured to cause the at least one processor to perform the PCC, based on the obtained occupancy code of the current node.

The candidate node may be spatially adjacent to the current node and is in a same depth of the octree partition as the current node.

The candidate node may be predetermined, is spatially non-adjacent to the current node and is in a same depth of the octree partition as the current node.

The candidate node may be a parent node or a grandparent node of the current node.

The candidate node may be in a previously-coded frame before a currently-coded frame including the current node.

The candidate node may be obtained from a predetermined table.

The apparatus 600 may further include determining code 660 configured to cause the at least one processor to determine whether a flag indicates that the geometry merge mode is enabled. The candidate node may be obtained based on the flag being determined to indicate that the geometry merge mode is enabled.

The candidate list may be constructed to have a predetermined maximum size, and the geometry merge mode may be enabled for one or more predetermined depths of the octree partition.

The determining code 660 may be further configured to cause the at least one processor to determine whether a flag indicates a difference between the obtained occupancy code of the current node and a final occupancy code of the current node is enabled. The apparatus 600 may further include modifying code 670 configured to cause the at least one processor to, based on the flag being determined to indicate that the difference is enabled, modify the obtained occupancy code of the current node. The PCC may be performed based on the modified occupancy code of the current node.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein may be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of a geometry merge mode for point cloud coding (PCC), the method being performed by at least one processor, and the method comprising:
    determining a maximum depth of an octree partition and a minimum depth of the octree partition where the geometry merge mode is permitted;
    obtaining a candidate node of the octree partition of a point cloud, for a current node of the octree partition, the current node being currently-coded, and the candidate node being previously-coded, wherein the current node is at a depth between the maximum depth and the minimum depth where the geometry merge mode is permitted;
    obtaining an occupancy code of the obtained candidate node;
    constructing a candidate list comprising the obtained occupancy code of the candidate node;
    obtaining an occupancy code of the current node, based on the constructed candidate list; and
    performing the PCC, based on the obtained occupancy code of the current node.

2. The method of claim 1, wherein the candidate node is spatially adjacent to the current node and is in a same depth of the octree partition as the current node.

3. The method of claim 1, wherein the candidate node is predetermined, is spatially non-adjacent to the current node and is in a same depth of the octree partition as the current node.

4. The method of claim 1, wherein the candidate node is a parent node or a grandparent node of the current node.

5. The method of claim 1, wherein the candidate node is in a previously-coded frame before a currently-coded frame comprising the current node.

6. The method of claim 1, wherein the candidate node is obtained from a predetermined table.

7. The method of claim 1, further comprising determining whether a flag indicates that the geometry merge mode is enabled,
wherein the candidate node is obtained based on the flag being determined to indicate that the geometry merge mode is enabled.

8. The method of claim 7, wherein the candidate list is constructed to have a predetermined maximum size, and
the geometry merge mode is enabled for one or more predetermined depths of the octree partition.

9. The method of claim 1, further comprising:
determining whether a flag indicates a difference between the obtained occupancy code of the current node and a final occupancy code of the current node is enabled; and
based on the flag being determined to indicate that the difference is enabled, modifying the obtained occupancy code of the current node,
wherein the PCC is performed based on the modified occupancy code of the current node.

10. An apparatus for a geometry merge mode for point cloud coding (PCC), the apparatus comprising:
at least one memory configured to store program code; and
at least one processor configured to read the program code and operate as instructed by the program code, the program code comprising:
depth determining code configured to cause the at least one processor to determine a maximum depth of an octree partition and a minimum depth of the octree partition where the geometry merge mode is permitted;
first obtaining code configured to cause the at least one processor to obtain a candidate node of the octree partition of a point cloud, for a current node of the octree partition, the current node being currently-coded, and the candidate node being previously-coded, wherein the current node is at a depth between the maximum depth and the minimum depth where the geometry merge mode is permitted;
second obtaining code configured to cause the at least one processor to obtain an occupancy code of the obtained candidate node;
constructing code configured to cause the at least one processor to construct a candidate list comprising the obtained occupancy code of the candidate node;
third obtaining code configured to cause the at least one processor to obtain an occupancy code of the current node, based on the constructed candidate list; and
performing code configured to cause the at least one processor to perform the PCC, based on the obtained occupancy code of the current node.

11. The apparatus of claim 10, wherein the candidate node is spatially adjacent to the current node and is in a same depth of the octree partition as the current node.

12. The apparatus of claim 10, wherein the candidate node is predetermined, is spatially non-adjacent to the current node and is in a same depth of the octree partition as the current node.

13. The apparatus of claim 10, wherein the candidate node is a parent node or a grandparent node of the current node.

14. The apparatus of claim 10, wherein the candidate node is in a previously-coded frame before a currently-coded frame comprising the current node.

15. The apparatus of claim 10, wherein the candidate node is obtained from a predetermined table.

16. The apparatus of claim 10, further comprising determining code configured to cause the at least one processor to determine whether a flag indicates that the geometry merge mode is enabled,
wherein the candidate node is obtained based on the flag being determined to indicate that the geometry merge mode is enabled.

17. The apparatus of claim 16, wherein the candidate list is constructed to have a predetermined maximum size, and
the geometry merge mode is enabled for one or more predetermined depths of the octree partition.

18. The apparatus of claim 10, further comprising:
determining code configured to cause the at least one processor to determine whether a flag indicates a difference between the obtained occupancy code of the current node and a final occupancy code of the current node is enabled; and
modifying code configured to cause the at least one processor to, based on the flag being determined to indicate that the difference is enabled, modify the obtained occupancy code of the current node,
wherein the PCC is performed based on the modified occupancy code of the current node.

19. A non-transitory computer-readable medium storing instructions that, when executed by at least one processor of an apparatus for a geometry merge mode for point cloud coding (PCC), cause the at least one processor to:
determining a maximum depth of an octree partition and a minimum depth of the octree partition where the geometry merge mode is permitted;
obtain a candidate node of the octree partition of a point cloud, for a current node of the octree partition, the current node being currently-coded, and the candidate node being previously-coded, wherein the current node is at a depth between the maximum depth and the minimum depth where the geometry merge mode is permitted;
obtain an occupancy code of the obtained candidate node;
construct a candidate list comprising the obtained occupancy code of the candidate node;
obtain an occupancy code of the current node, based on the constructed candidate list; and
perform the PCC, based on the obtained occupancy code of the current node.

20. The non-transitory computer-readable medium of claim 19, wherein the instructions further cause the at least one processor to determine whether a flag indicates that the geometry merge mode is enabled, and
the candidate node is obtained based on the flag being determined to indicate that the geometry merge mode is enabled.

* * * * *